(12) United States Patent
Schroedle et al.

(10) Patent No.: US 8,980,475 B2
(45) Date of Patent: Mar. 17, 2015

(54) PROCESS FOR PREPARING LITHIUM MIXED METAL OXIDES AND THEIR USE AS CATHODE MATERIAL

(75) Inventors: Simon Schroedle, Ludwigshafen (DE); Hartmut Hibst, Schriesheim (DE); Jordan Keith Lampert, Ludwigshafen (DE); Mark Schweter, Medina, OH (US); Ivan Petrovic, Princeton, NJ (US)

(73) Assignee: BASF SE, Ludwigshafen (DE)

( * ) Notice: Subject to any disclaimer, the term of this patent is extended or adjusted under 35 U.S.C. 154(b) by 599 days.

(21) Appl. No.: 13/167,079

(22) Filed: Jun. 23, 2011

(65) Prior Publication Data

US 2011/0315938 A1 Dec. 29, 2011

Related U.S. Application Data

(60) Provisional application No. 61/358,440, filed on Jun. 25, 2010.

(51) Int. Cl.
| | |
|---|---|
| *H01M 4/13* | (2010.01) |
| *C01D 1/02* | (2006.01) |
| *C01G 45/12* | (2006.01) |
| *H01B 1/08* | (2006.01) |
| *C01G 53/00* | (2006.01) |
| *H01M 4/505* | (2010.01) |
| *H01M 4/525* | (2010.01) |

(52) U.S. Cl.
CPC .............. *H01B 1/08* (2013.01); *C01G 53/50* (2013.01); *H01M 4/505* (2013.01); *H01M 4/525* (2013.01); *C01P 2006/10* (2013.01); *C01P 2006/11* (2013.01); *C01P 2006/40* (2013.01); *Y02E 60/122* (2013.01); *C01P 2002/50* (2013.01)
USPC ..... 429/231.3; 429/223; 429/224; 423/594.4; 423/594.6; 423/599

(58) Field of Classification Search
USPC ...................... 429/231.3, 224, 223, 209, 218; 423/599, 594.4, 594.6, 594
See application file for complete search history.

(56) References Cited

U.S. PATENT DOCUMENTS

| | | | |
|---|---|---|---|
| 4,980,080 A | 12/1990 | Lecerf et al. | |
| 5,264,201 A * | 11/1993 | Dahn et al. | 252/519.1 |
| 5,626,635 A | 5/1997 | Yamaura et al. | |
| 5,993,998 A | 11/1999 | Yasuda | |
| 6,241,959 B1 | 6/2001 | Cho et al. | |
| 6,680,143 B2 | 1/2004 | Thackeray et al. | |
| 2002/0136954 A1 | 9/2002 | Thackeray et al. | |
| 2005/0026040 A1 | 2/2005 | Thackeray et al. | |
| 2007/0202405 A1* | 8/2007 | Shizuka et al. | 429/231.3 |

FOREIGN PATENT DOCUMENTS

| | | |
|---|---|---|
| CN | 1186351 A | 7/1998 |
| JP | 7-142093 | 6/1995 |
| JP | 8-22826 | 1/1996 |
| JP | 2000-173599 * | 6/2000 |
| JP | 2004-281163 | 10/2004 |
| JP | 2005-196992 | 7/2005 |
| JP | 2006-127923 | 5/2006 |
| JP | 2007-317585 | 12/2007 |

OTHER PUBLICATIONS

U.S. Appl. No. 13/344,802, filed Jan. 6, 2012, Schulz-Dobrick, et al.
U.S. Appl. No. 13/344,784, filed Jan. 6, 2012, Krippels, et al.
U.S. Appl. No. 13/761,406, filed Feb. 7, 2013, Schulz-Dobrick, et al.
U.S. Appl. No. 13/302,007, filed Nov. 22, 2011, Schulz-Dobrick, et al.
U.S. Appl. No. 13/302,370, filed Nov. 22, 2011, Schulz-Dobrick, et al.
International Search Report issued Nov. 3, 2011, in PCT/IB2011/052784.
J. Morales, et al., "Acid-Delithiated $Li_{1-x}(Ni_yCo_{1-y})_{1-x}O_2$ as Insertion Electrodes in Lithium Batteries", Journal of Solid State Chemistry, vol. 113, 1994, pp. 182-192.
Tsutomu Ohzuku, et al., "Comparative Study of $LiCoO_2$, $LiNi_{1/2}Co_{1/2}O_2$ and $LiNiO_2$ for 4 Volt Secondary Lithium Cells", Electrochimica Acta, vol. 38, No. 9, 1993, pp. 1159-1167.

* cited by examiner

*Primary Examiner* — Monique Peets
(74) *Attorney, Agent, or Firm* — Oblon, McClelland, Maier & Neustadt, L.L.P.

(57) ABSTRACT

Process for preparing lithium mixed metal oxides which comprise essentially lithium, manganese, cobalt and nickel as metal atoms and have a stoichiometric ratio of lithium to the total transition metals of greater than 1, which comprises a) the preparation of a mixture designated as intermediate (B) which comprises essentially lithium-comprising mixed metal hydroxides and lithium-comprising mixed metal oxide hydroxides,
where manganese, cobalt and nickel are comprised in the ratio (1-a-b):a:b and the oxidation state averaged over all ions of manganese, cobalt and nickel is at least 4-1.75a-1.75b, where $0 \le a \le 0.5$ and $0.1 \le b \le 0.8$,
by a thermal treatment carried out with continual mixing and in the presence of oxygen of a mixture (A) comprising at least one transition metal compound and at least one lithium salt (L), during which L does not melt, and b) the thermal treatment carried out without mixing and in the presence of oxygen of the intermediate (B).

10 Claims, No Drawings

PROCESS FOR PREPARING LITHIUM MIXED METAL OXIDES AND THEIR USE AS CATHODE MATERIAL

CROSS REFERENCE TO RELATED APPLICATION

This application claims the benefit of U.S. provisional application No. 61/358,440, filed on Jun. 25, 2010.

The present invention relates to a process for preparing lithium mixed metal oxides which comprise essentially lithium, manganese, cobalt and nickel as metal atoms and have a stoichiometric ratio of lithium to the total transition metals of greater than 1, a method of controlling the two-stage preparation of these lithium mixed metal oxides and the use of the compounds prepared in this way as cathode material in a lithium ion battery.

In an increasingly mobile society, portable electric appliances are playing an ever greater role. Rechargeable batteries, in particular lithium ion batteries, have for many years been used in virtually all fields of daily life. The anode of a modern high-energy lithium ion battery nowadays typically comprises graphite but it can also be based on metallic lithium, a lithium alloy or a lithium compound. For construction of the cathode of a modern lithium ion battery, various lithium transition metal oxides, in particular lithium nickel oxides, lithium cobalt oxides, lithium manganese oxides and lithium nickel manganese cobalt oxides (hereinafter referred to as "Li—NMC oxides"), have been used in recent years.

"Li—NMC oxides" which have a stoichiometric ratio of lithium to the total transition metals of greater than 1 and are hereinafter referred to as "superstoichiometric Li—NMC oxides" are known. However, Li—NMC oxides which have a stoichiometric ratio of lithium to the total transition metals of less than or equal to 1 and are hereinafter referred to as "substoichiometric Li—NMC oxides" are also known. Processes for preparing Li—NMC oxides are already known in the prior art.

US 2007/0202405 A1 describes a process consisting essentially of a calcination step for preparing superstoichiometric Li—NMC oxides of the formula $Li_{1+z}Ni_xMn_yCO_{1-x-y}O_\delta$ (where $0<z\leq0.91$, $0.1\leq x\leq0.55$, $0.2\leq y\leq0.9$, $0.5\leq x+y\leq1$, $1.9\leq\delta\leq3$). As shown in the examples, the calcination is carried out for a time of from 10 to 12 hours and at a temperature of from 950° C. to 990° C.

JP-A-2000-173599 describes a process comprising two steps for preparing lithium-comprising mixed metal oxides of the formula $LiNi_{(1-x)}CO_yM_zO_2$ (where $0.1\leq x\leq0.3$, $0\leq y\leq0.3$, $0\leq z\leq0.3$, and $x=y+z$, and M is one or more elements selected from among Al, Mn, Mg, Fe, V, Ca, Ti, and Cr). If these mixed metal oxides comprise Mn as M, they are substoichiometric Li—NMC oxides. In this process, a mixture of $Ni_{(1-x)}CO_yM_z$ hydroxide and lithium hydroxide is subjected to a continuous dehydration in the first step, where the temperature can be the melting point of lithium hydroxide or a lower temperature. In the second step, calcination is carried out in a steady state.

It was an object of the present invention to provide an efficient process for preparing superstoichiometric Li—NMC oxides, which can be carried out in short process times and at low temperatures. Firstly, Li—NMC oxides which as cathode material have a high degree of safety in use should be made available by means of the process. Secondly these Li—NMC oxides should have a high specific capacity as cathode material.

A further object of the invention was to provide a method of controlling the two-stage preparation of superstoichiometric Li—NMC oxides, which controls the preparative process in such a way that the latter can be carried out in short process times and at low temperatures.

The abovementioned objects of the present invention are achieved by the process of the invention for preparing lithium mixed metal oxides which comprise essentially lithium, manganese, cobalt and nickel as metal atoms and have a stoichiometric ratio of lithium to the total transition metals of greater than 1, which comprises a) the preparation of a mixture designated as intermediate (B) which comprises essentially lithium-comprising mixed metal hydroxides and lithium-comprising mixed metal oxide hydroxides, where manganese, cobalt and nickel are comprised in the ratio (1-a-b):a:b and the oxidation state averaged over all ions of manganese, cobalt and nickel is at least 4-1.75a-1.75b, where $0\leq a\leq0.5$ and $0.1\leq b\leq0.8$, by a thermal treatment carried out with continual mixing and in the presence of oxygen of a mixture (A) comprising at least one transition metal compound and at least one lithium salt (L), where lithium salt (L) does not melt during the thermal treatment, and b) the thermal treatment carried out without mixing and in the presence of oxygen of the intermediate (B).

The abovementioned objects of the present invention are achieved by the method according to the invention of controlling a two-stage preparation of lithium mixed metal oxides which comprise essentially lithium, manganese, cobalt and nickel as metal atoms and have a stoichiometric ratio of lithium to the total transition metals of greater than 1, where the control parameter (P) is the oxidation state averaged over all ions of manganese, cobalt and nickel of the mixture which comprises essentially lithium-comprising mixed metal hydroxides and lithium-comprising mixed metal oxide hydroxides and here comprises the metal ions manganese, cobalt and nickel in the ratio (1-a-b):a:b and can be obtained from a thermal treatment in the presence of oxygen with continual mixing, and the exceeding of the (P) threshold value of 4-1.75a-1.75b determines the point in time at which the change to a thermal treatment in the presence of oxygen without mixing is carried out.

Furthermore, we have found the use according to the invention of the superstoichiometric Li—NMC oxides which can be obtained in the abovementioned preparative process as cathode material for a lithium ion battery.

Preferred embodiments are disclosed in the subclaims and in the description. Combinations of preferred embodiments are likewise within the scope of the present invention.

The abovementioned preparative process of the invention comprises essentially two stages. These two stages can be separated in time and in space, and each stage can comprise a plurality of individual substeps.

The abovementioned preparative process of the invention comprises the preparation of the intermediate (B) by thermal treatment of the mixture (A).

According to the invention, the mixture (A) comprises at least one transition metal compound and at least one lithium salt (L). As regards the first-named component, the mixture (A) preferably comprises from one to four transition metal compounds, particularly preferably one transition metal compound. With regard to the last-named component, the mixture (A) preferably comprises from one to four lithium salts (L), particularly preferably one lithium salt (L).

The at least one transition metal compound comprises at least one of the metals manganese, cobalt and nickel. At least one transition metal compound preferably comprises manganese, cobalt and nickel. At least one transition metal compound particularly preferably comprises manganese, cobalt and nickel in a ratio of (1-a-b):a:b, where $0 \leq a \leq 0.5$ and $0.1 \leq b \leq 0.8$. For example, at least one transition metal compound comprises manganese, cobalt and nickel in a ratio of (1-a-b):a:b, where $0.1 \leq a \leq 0.4$ and $0.2 \leq b \leq 0.6$.

The transition metal compound can be chosen from hydroxides, oxides, oxide-hydroxides and carbonates, preferably from oxide hydroxides, particularly preferably from mixed metal oxide hydroxides.

The at least one transition metal compound can additionally comprise one or more doping elements. In general, the transition metal compound comprises not more than four doping elements. Preferred doping elements include Na, K, Ca, Zn, Mg, Al, Zr and Ti. The transition metal compound preferably comprises not more than two, particularly preferably not more than one, of these doping elements. For example, the transition metal compound comprises Mg and/or Al as doping element(s). The total molar proportion of all doping elements in the at least one transition metal compound is generally not more than 5%, preferably not more than 2%, particularly preferably not more than 1%, based on all metal atoms in the at least one transition metal compound. If the transition metal compound comprises one or more doping elements, the proportion of these is generally at least 0.01%, preferably at least 0.1%, particularly preferably at least 0.5%, based on all metal atoms in the at least one transition metal compound.

The at least one transition metal compound can generally be obtained in various ways. The transition metal compound is preferably obtained by coprecipitation of the oxides, oxide hydroxides or hydroxides of the elements manganese, cobalt, nickel and optionally the doping element(s).

The at least one transition metal compound can generally be present in various forms. The transition metal compound is preferably present in particle form, particularly preferably in an essentially spherical particle form. Macroscopically, the transition metal compound is generally present in powder form, for example as free-flowing powder. Among free-flowing powders, particular preference is given to those which are agglomerate-free. On the microscopic scale, agglomerate-free means that the particles which form, for example, in the coprecipitation, are not caked together.

The at least one transition metal compound can generally have various particle sizes. The transition metal compound preferably has a D50 of from 2 to 50 µm, particularly preferably a D50 of from 5 to 20 µm. The D50 is also referred to as average particle size and is defined as the median of the particle size which is exceeded by 50 percent by volume of the sample and is not reached by the other 50 percent by volume of the sample.

Lithium salt (L) can generally be any possible lithium salt.

In one embodiment, lithium salt (L) is one of the readily water-soluble lithium salts known to those skilled in the art. Preferred readily water-soluble lithium salts have a solubility in water at 20° C. and atmospheric pressure of more than 30 g/l, so that it is possible to bring high concentrations of lithium ions into solution, which is particularly advantageous in the preparation of superstoichiometric Li—NMC oxides. Particularly preferred readily water-soluble lithium salts are lithium hydroxide and lithium hydroxide hydrate.

In another embodiment, the lithium salt (L) is one of the sparingly water-soluble lithium salts known to those skilled in the art. Preferred sparingly water-soluble lithium salts have a solubility in water at 20° C. and atmospheric pressure of less than 20 g/l. A particularly preferred sparingly water-soluble lithium salt is lithium carbonate. The sparingly water-soluble lithium salt can generally have various particle sizes, i.e. different D50 values and D99 values. The sparingly water-soluble lithium salt preferably has a D50 of from 1 to 80 µm, particularly preferably a D50 of from 2 to 20 µm. The sparingly water-soluble lithium salt preferably has a D99 of less than 200 µm, particularly preferably a D99 of less than 60 µm. The D99 is the value which is exceeded by one percent by volume of the sample and is not reached by the other 99 percent by volume of the sample.

The mixture (A) can generally be produced by various methods. In the embodiment in which a readily water-soluble lithium salt is used as lithium salt (L), the mixture (A) is preferably obtained by a method comprising spray drying of a suspension comprising water, at least one lithium salt (L) and at least one transition metal compound, with at least the lithium salt (L) being completely dissolved in the suspension.

Regardless of whether a readily water-soluble or sparingly water-soluble lithium salt or a mixture of readily and sparingly water-soluble lithium salts is used as lithium salt (L), the mixture (A) can be obtained by mixing at least one lithium salt (L) with at least one transition metal compound. Here, the mixture (A) is preferably obtained by mixing at least one lithium salt (L) with at least one transition metal compound to give a starting mixture and subsequently adding water to the starting mixture produced in this way. This is particularly preferred when a sparingly water-soluble lithium salt is used as or as part of the lithium salt (L). In this connection, the addition of water has a stabilizing effect on the starting mixture. As a result of the stabilization, the tendency for demixing to occur, for example when the mixture is subjected to vibration, is reduced. Depending on the lithium salt (L) used, various amounts of water can be added. The amount of water added is usually from 0.1% to 4%, preferably from 0.5% to 2.5%, particularly preferably from 1.5% to 2%, based on the total weight of the mixture (A).

The thermal treatment of the mixture (A) can generally be carried out in one step or in a plurality of substeps which can be separated from one another both in space and time. Preference is given to carrying out the thermal treatment of the mixture (A) in essentially one step.

The thermal treatment of the mixture (A) is, according to the invention, carried out with mixing. Here, the term mixing refers to the mechanical mixing process in which the sample to be mixed is moved in such a way that a very uniform composition (homogeneity) is achieved.

The thermal treatment of the mixture (A) is, according to the invention, carried out with continual mixing. The expression "continual" means that no phases of substantial interruptions occur.

The continual mixing can generally be carried out by means of various numbers and types of mixing apparatuses. The continual mixing is preferably carried out in a rotary tube furnace and/or rotary bulb furnace. Among rotary tube furnaces, preference is given to those in which high-temperature materials based on Fe—Ni—Cr or ceramic materials based on $SiO_2$, MgO and/or $Al_2O_3$ are used for the parts of the furnace which come into contact with the product. For example, use is made of a rotary tube furnace which is provided with devices such as lifting blades and indentations which are arranged essentially parallel to the axis of rotation on the rotary tube. This promotes optimal mixing of the mixture, aids reactions of the mixture with the gas phase and counters formation of agglomerates.

The continual mixing can in principle be carried out with or without transport of material. The continual mixing is preferably carried out with transport of material.

According to the invention, the thermal treatment of the mixture (A) is carried out in the presence of oxygen. Here, the oxygen can be present as pure oxygen, as a constituent of air or as a constituent of other oxygen-comprising gas mixtures. For the present purposes, an oxygen-comprising gas stream is a gas stream comprising at least 0.1 percent by volume, preferably at least 1 percent by volume, particularly preferably at least 5 percent by volume, of oxygen. For example, the oxygen-comprising gas stream is a stream of air. In general, the oxygen-comprising gas stream can be conveyed in various directions relative to the predominant flow direction of the material. For the present purposes, the predominant flow direction of the material is the direction in which the mixture (A) is essentially moved through the mixing apparatus during the continual mixing. The thermal treatment of the mixture (A) is preferably carried out with an oxygen-comprising gas stream being introduced essentially in the direction of flow of the material.

In general, a flow direction of material prevails in the rotary tube furnace. A rotary bulb furnace is generally operated batchwise. i.e. operated by initially introducing the material to be calcined, subsequently heating the rotary bulb and then cooling the bulb and finally taking out the calcined material. The thermal treatment of the mixture (A) in a rotary tube furnace and/or rotary bulb furnace is preferably carried out with an oxygen-comprising gas stream being introduced essentially in the predominant direction of flow of the material. This thermal treatment is particularly preferably carried out in a rotary tube furnace with an oxygen-comprising gas stream being introduced essentially in the predominant direction of flow of the material.

The thermal treatment of the mixture (A) can generally be carried out at various volume flows of the oxygen-comprising gas stream, based on the weight of the mixture (A). The volume flow is dependent on the lithium salt (L) used. If the lithium salt (L) comprised in the mixture (A) is a readily water-soluble lithium salt, the oxygen-comprising gas stream is preferably set to a volume flow of from 10 to 300 liters of oxygen per hour per kilogram, particularly preferably to a volume flow of from 30 to 100 liters of oxygen per hour per kilogram, based on the weight of the mixture (A), in the thermal treatment of the mixture (A). If the lithium salt (L) comprised in the mixture (A) is a sparingly water-soluble lithium salt, the oxygen-comprising gas stream is preferably set to a volume flow of from 6 to 180 liters of oxygen per hour per kilogram, particularly preferably to a volume flow of from 30 to 80 liters of oxygen per hour per kilogram, based on the weight of the mixture (A), in the thermal treatment of the mixture (A).

According to the invention, the thermal treatment of the mixture (A) is carried out in such a way that the lithium salt(s) (L) comprised in the mixture (A) does/do not melt. If lithium salt (L) is lithium hydroxide or lithium hydroxide hydrate, this thermal treatment is preferably carried out at temperatures of from 250° C. to 400° C., particularly preferably at temperatures of from 310° C. to 390° C., for example at temperatures of from 340° C. to 360° C. If lithium salt (L) is lithium carbonate, this thermal treatment is preferably carried out at temperatures of from 300° C. to 710° C., particularly preferably at temperatures of from 450° C. to 675° C., for example at temperatures of from 520° C. to 580° C.

The intermediate (B) is, according to the invention, a mixture which comprises essentially lithium-comprising mixed metal hydroxides and lithium-comprising mixed metal oxide hydroxides and in which manganese, cobalt and nickel are comprised in a ratio of (1-a-b):a:b and the oxidation state averaged over all ions of manganese, cobalt and nickel is at least $4-1.75a-1.75b$, where $0 \leq a \leq 0.5$ and $0.1 \leq b \leq 0.8$. The intermediate (B) can comprise residues of one or more lithium salts (L).

Lithium mixed metal oxides which comprise essentially lithium, manganese, cobalt and nickel as metal atoms and have a stoichiometric ratio of lithium to the total transition metals of greater than 1 are prepared, according to the invention, by thermal treatment of the intermediate (B).

The thermal treatment of the intermediate (B) can be carried out generally in one step or in a plurality of substeps which can be separated from one another in space and time. The thermal treatment of the intermediate (B) is preferably carried out in essentially one step.

The thermal treatment of the intermediate (B) is, according to the invention, carried out without mixing.

In general, the thermal treatment of the intermediate (B) can be carried out in various numbers and types of furnaces. This thermal treatment is preferably carried out in a tunnel kiln and/or chamber furnace. Possible tunnel kilns are, for example, a rolling hearth furnace or a push-through furnace.

In general, the thermal treatment of the intermediate (B) can be carried out in the total amount of the intermediate (B) or be carried out with the intermediate (B) divided into individual partial amounts. This thermal treatment is preferably carried out with the intermediate (B) being divided into individual partial amounts and introduced into individual containers. The containers can in general be containers of various types. These containers are preferably containers made essentially of oxidic ceramic, particularly preferably containers made of aluminum oxide or aluminosilicates.

For example, the thermal treatment of the intermediate (B) is carried out with (B) being divided into partial amounts and introduced into individual containers which are made essentially of oxidic ceramic and being treated in a tunnel kiln and/or chamber furnace. In this way, it can be ensured, even in continuous operation, i.e. when the intermediate (B) is introduced into and again taken out from the tunnel kiln and/or chamber furnace at a particular pushing velocity, that the residence times of the material being thermally treated in the furnace are essentially the same or differ very lithe.

According to the invention, the thermal treatment of the intermediate (B) is carried out in the presence of oxygen. Here, the oxygen can be present as pure oxygen, as a constituent of air or as a constituent of other oxygen-comprising gas mixtures. For the present purposes, an oxygen-comprising gas stream is a gas stream comprising at least 0.1 percent by volume, preferably at least 1 percent by volume, particularly preferably at least 5 percent by volume, of oxygen. For example, the oxygen-comprising gas stream is a stream of air. In general, the oxygen-comprising gas stream can be conveyed in various directions relative to the predominant flow direction of the material. The thermal treatment of the intermediate (B) is preferably carried out with an oxygen-comprising gas stream being introduced essentially perpendicular to or counter to the predominant flow direction of the material.

Containers which may be mentioned are for example crucibles, preferably crucibles made of ceramic material, in particular crucibles made of refractory ceramic material.

In general, a flow direction of material prevails in the tunnel kiln.

A chamber furnace is generally operated in a steady-state manner, i.e., for example, with one or more containers to be heated firstly being introduced into the furnace, the furnace subsequently being brought to temperature and the container(s) being taken out again after cooling. The thermal treatment of the intermediate (B) is preferably carried out in a tunnel kiln and/or chamber furnace, namely with an oxygen-comprising gas stream being introduced essentially perpendicular to or counter to the predominant flow direction of the material. This thermal treatment is particularly preferably carried out in a tunnel kiln with an oxygen-comprising gas stream being introduced essentially perpendicular to or counter to the predominant flow direction of the material.

The thermal treatment of the intermediate (B) can generally be carried out continuously or batchwise. If this thermal treatment is carried out batchwise, a gas exchange in the furnace can be carried out at equal or different time intervals. If air is used as process gas, this gas exchange in the furnace is referred to as an air change. The gas replacement rate is generally calculated from the volume enclosed in the furnace and the gas flow introduced, based on standard conditions (0° C., 1013 mbar). If, for example, the volume enclosed in the furnace were to be 100 liters and the gas flow introduced were to be 1000 l/h, the gas replacement rate would be ten times. The measurement is usually carried out by means of a rotameter (gas flow measuring instrument) in the gas feed line to the furnace.

The thermal treatment of the intermediate (B) can generally be carried out at various temperatures. This thermal treatment is preferably carried out at temperatures of from 500° C. to 1200° C., particularly preferably at temperatures of from 725° C. to 975° C.

The end products which can be obtained from the above-described process of the invention are lithium mixed metal oxides which comprise essentially lithium, manganese, cobalt and nickel as metal ions and have a stoichiometric ratio of lithium to the total transition metals of greater than 1. The end product is preferably a compound of the general formula

$$Li_{1+x}(Mn_{1-a-b}Co_aNi_b)_{1-y}M_yO_{2+z}R_{z'},$$

where
- −0.05≤x≤0.75
- 0≤a≤0.5
- 0.1≤b≤0.8
- 0≤y≤0.05
- −0.1x<z<0.1x
- 0≤z'<0.04, and M is one or more metals selected from the group consisting of Na, K, Ca, Zn, Mg, Al, Zr, Ti, R is one or more elements selected from the group consisting of fluorine and hydrogen.

The end product is particularly preferably a compound of the general formula indicated above in which 0≤z'<0.01.

For example, the end product is a compound of the general formula indicated above in which a=0.2 and b=0.5.

In a further embodiment, the end product is, for example, a compound of the general formula indicated above in which a=0.2 and b=0.4.

In a further embodiment, the end product is, for example, a compound of the general formula indicated above in which a=0.333 and b=0.333.

In a further embodiment, the end product is, for example, a compound of the general formula indicated above in which a=0.1 and b=0.5.

In a further embodiment, the end product is, for example, a compound of the general formula indicated above in which a=0.1 and b=0.45.

End products obtained according to the invention can be used as cathode material for a lithium ion battery.

The preparative process of the invention is an efficient process for preparing superstoichiometric Li—NMC oxides which can be carried out in short process times and at low temperatures. The Li—NMC oxides obtained from the preparative process of the invention have a high degree of safety and a high specific capacity as cathode material.

When the preparative process of the invention is carried out, the corrosion of furnace materials which are in contact with product remains at a barely significant level since relatively low temperatures are used, particularly in the thermal treatment of the mixture (A). In addition, the end product obtained from the preparative process has a high homogeneity of the lithium distribution and displays no agglomeration of the particles, so that a subsequent milling step is generally not necessary. Furthermore, a significantly better furnace utilization is possible in the thermal treatment of the intermediate (B) since (B) usually has a higher tamped density than other intermediates which do not meet the abovementioned prerequisites of (B).

Apart from the above-described preparative process, the invention also provides a control method which controls the two-stage preparation of lithium mixed metal oxides which comprise essentially the ions of lithium, manganese, cobalt and nickel as metal ions and have a stoichiometric ratio of lithium to the total transition metals of greater than 1. In this control method, the control parameter (P) is the oxidation state averaged over all ions of manganese, cobalt and nickel of the mixture which comprises essentially lithium-comprising mixed metal hydroxides and lithium-comprising mixed metal oxide hydroxides and also comprises the metals manganese, cobalt and nickel in the ratio (1-a-b):a:b and can be obtained from a thermal treatment in the presence of oxygen with continual mixing. According to the invention, the exceeding of the (P) threshold value of 4-1.75a-1.75b determines the point in time at which the change to a thermal treatment without mixing is carried out.

This control method allows the two-stage preparation of the abovementioned lithium mixed metal oxides to be carried out in such a way that it is carried out at low temperatures and in short process times and at the same time gives lithium mixed metal oxides which when used as cathode materials at the same time have a high degree of safety in use and a high specific capacity.

When all process parameters of the two-stage preparation of the abovementioned lithium mixed metal oxides have been set by means of this control method, it is sufficient then to carry out this two-stage preparation with the control parameter (P) being checked only at intervals, as long as all other process parameters remain unchanged.

EXAMPLES

The determination of the D50 and the D99 is carried out, for example, by laser light scattering (Malvern Mastersizer 2000, ISO 13320:2009), with the particle size being evaluated by means of the Malvern Software (Malvern Application Version 5.60) with the assumption of spherical particles. For the determination method, see also: Koichi Iinoya, Hiroaki Masuda, Kinnosuke Watanabe, "Powder and bulk solids handling processes: instrumentation and control", New York: Marcel Dekker, 1988, ISBN 0-8247-7971-1, pages 164 to 173.

The abovementioned oxidation state can be determined by the iodine-thiosulfate method described below: a particular amount of the sample substance was introduced into a distillation flask and admixed with 20% strength by weight hydrochloric acid. The distillation flask is carefully heated until the solution boils. The distillate and the chlorine vapors formed were passed into a receiver in which 10% strength by weight potassium iodide solution was present. The distillation was continued until the hydrochloric acid had been largely evaporated. The distillate was subsequently acidified with 1 molar sulfuric acid and the iodine liberated was backtitrated with 0.1 molar sodium thiosulfate solution, with starch being added to enable the end point to be recognized. The average oxidation state of the transition metals manganese, cobalt and nickel in the sample can be calculated from the consumption of thiosulfate solution ($n_{thio}$ in mol/g of sample) and the metal content of the sample (sum of manganese+cobalt+nickel in mol/g; $n_{metal}$) according to $$2+n_{thio}/n_{metal}.$$

To determine the electrochemical data of the materials, 80% of lithium mixed metal oxide, 10% of carbon black (Super P Li) and 10% of polyvinylidene fluoride copolymer (Kynar Flex® 2801) were intimately mixed with addition of N-methylpyrrolidone (NMP) to form a paste. An electrode was produced from this by coating a 30 μm thick aluminum foil (active material loading: 5 to 7 mg/cm$^2$). After drying at 105° C., circular electrodes (diameter: 20 mm) were stamped out and installed in test cells. A 1 mol/l solution of LiPF$_6$ in ethylene carbonate/dimethyl carbonate (1:1 based on proportions by mass) was used as electrolyte. The anode of the test cells comprised a lithium foil which was separated from the cathode by a separator composed of fiberglass paper.

To cyclize the test cells, the cells were connected to a potentiostat, with the charging/discharging currents (C ratio) being calculated for a capacity of 150 mAh/g, i.e. 1 C corresponds to 150 mA/g of cathode material. The switching-off voltage for the charging and discharging operations were set to 4.3 V and 3.0 V, respectively.

The cells were firstly activated for 2 cycles at 0.1 C (15 mA/g), and the capacity was then determined at 0.2 C (30 mA/g; 5 cycles) (average of the 5 discharging capacities). The discharging current was then increased to 6.5 C over 5 cycles, with the charging current being maintained at 0.2 C (steps: 0.4 C, 0.8 C, 1.6 C, 3.2 C, 6.5 C).

The discharging capacity at 6.5 C serves as a measure of current load rating.

The tamped densities were determined by means of a tamping volumeter (for example STAV II from J. Engelsmann AG, Ludwigshafen), with the sample volume before tamping being 25 ml and the sample being tamped 2000 times, before measuring.

The oxidation state averaged over all ions of manganese, cobalt and nickel will hereinafter be referred to as "average oxidation state". The average oxidation state was determined by the above-described iodine-thiosulfate method. The D50 values, the D99 values, the tamped densities and the electrochemical data were determined by the above-described methods.

In the context of the present invention % data always indicate percent by weight unless indicated otherwise.

Example 1

Preparation of $Li_{1+x}Ni_{0.33}Co_{0.33}Mn_{0.33}O_{2+x}$ (a=0.33; b=0.33), starting from lithium hydroxide monohydrate as lithium salt (L)

800.0 g of spherical coprecipitated mixed metal oxyhydroxide (20.6% of Ni, 21.0% of Co, 19.4% of Mn, D50=10 μm) were suspended in a solution of 388.15 g of lithium hydroxide monohydrate (58.1% of LiOH) in 1830 ml of deionized water and stirred at 60° C. under nitrogen for one hour. The suspension obtained was spray dried using air as working gas and at an inlet temperature of approx. 305° C. and an outlet temperature of 108-110° C. This gave 902.8 g of the mixture (A1) as spray-dried powder. 127.9 g of the mixture (A1) were subsequently calcined at 375° C. in a laboratory version of a rotary tube furnace for 30 minutes, with the heating and cooling rate being 12 K/min. The air flow was set to 313 l(air)/h·kg or 66 l(oxygen)/h·kg, based on the mixture (A1). 93.4 g of the intermediate (B1) were obtained in this way. The average oxidation state of (B1) was determined and was 2.998 and was thus above the value 4-1.75a-1.75b=2.845. 60.0 g of the intermediate (B1) were subsequently calcined in an Al$_2$O$_3$ crucible at 675° C. for one hour and at 900° C. for six hours, with the heating and cooling rate being 3 K/min. The bed height in the crucible was 2.5 cm. This gave 57.8 g of the end product (C1) which had the composition $Li_{1+x}Ni_{0.33}Co_{0.33}Mn_{0.33}O_{2+x}$. Details of average oxidation state, tamped density, composition and electrochemical data are shown in tables 1 and 3 below.

TABLE 1

Compositions, average oxidation states and tamped densities for example 1

| Example | Material | Li (g/100 g) | Ni (g/100 g) | Co (g/100 g) | Mn (g/100 g) | Average oxidation state | x | Tamped density (kg/l) |
|---|---|---|---|---|---|---|---|---|
| 1 | A1 | 6.4 | 15.9 | 16.2 | 15.0 | 2.665 | 1.13 | 0.942 |
| 1 | B1 |  | 18.1 | 18.5 | 17.1 | 2.998 | n.d. | 1.35 |
| 1 | C1 | 7.9 | 19.4 | 19.8 | 18.3 | 3.077 | 1.14 | 2.56 | n.d.: not determined

Example 2

Preparation of $Li_{1+x}Ni_{0.33}Co_{0.33}Mn_{0.33}O_{2+x}$ (a=0.33, b=0.33), starting from lithium carbonate as lithium salt (L)

2213.05 g of spherical coprecipitated mixed metal oxyhydroxide (20.6% of Ni, 21.0% of Co, 19.4% of Mn, D50=10 μm) were mixed with 990.08 g of lithium carbonate (D50=5 μm, D99 less than 40 μm) and the resulting mixture was stabilized by addition of 57.66 g of water. This gave 3259.0 g of the mixture (A2) as stabilized raw material mixture. 136.0 g of the mixture (A2) were subsequently calcined at 550° C. in a laboratory version of a rotary tube furnace for 30 minutes. The air flow was set to 294 l(air)/h·kg or 62 l(oxygen)/h·kg, based on the mass of material used. This gave 99.7 g of the intermediate (B2). The average oxidation state of (B2) was determined and was 2.982 and was thus above the value 4-1.75a-1.75b=2.845. 87.8 g of the intermediate (B2) were subsequently calcined in an $Al_2O_3$ crucible at 675° C. for one hour and at 900° C. for six hours, with the heating and cooling rate being 3 K/min. The bed height in the crucible was 2.5 cm. This gave 84.0 g of the end product (C2) which had the composition $Li_{1+x}Ni_{0.33}Co_{0.33}Mn_{0.33}O_{2+x}$. Details of average oxidation state, tamped density, composition and electrochemical data are shown in tables 2 and 3 below.

Comparative Example V3

Preparation of $Li_{1+x}Ni_{0.33}Co_{0.33}Mn_{0.33}O_{2+x}$ (a=0.33, b=0.33), starting from lithium carbonate as lithium salt (L)

The mixture (A3) was prepared in the same way as the mixture (A2) in example 2. 136.0 g of the mixture (A3) were subsequently calcined at 350° C. in a laboratory version of a rotary tube furnace for 30 minutes. The air flow was set to 294 l(air)/h·kg or 62 l(oxygen)/h·kg, based on the mass of material used. This gave 117.2 g of the intermediate (B3). The average oxidation state of (B3) was determined and was 2.777 and was thus below the value 4-1.75a-1.75b=2.845. 59 g of the intermediate (B3) were subsequently calcined in an $Al_2O_3$ crucible at 675° C. for one hour and at 900° C. for six hours, with the heating and cooling rate being 3 K/min. The bed height in the crucible was 2.5 cm. This gave 48.6 g of the end product (C3) which had the composition $Li_{1+x}Ni_{0.33}Co_{0.33}Mn_{0.33}O_{2+x}$. Details of average oxidation state, tamped density, composition and electrochemical data are shown in tables 2 and 3 below.

TABLE 2

Compositions, average oxidation states and tamped densities for example 2 and for comparative example V3

| Example | Material | Li (g/100 g) | Ni (g/100 g) | Co (g/100 g) | Mn (g/100 g) | Average oxidation state | X | Tamped density (kg/l) |
|---|---|---|---|---|---|---|---|---|
| 2 | A2 | 5.7 | 14.3 | 14.6 | 13.5 | 2.4 | 1.11 | 1 |
| V3 | A3 | 5.7 | 14.3 | 14.6 | 13.5 | 2.4 | 1.11 | 1 |
| 2 | B2 |  | 18.0 | 18.4 | 17.0 | 2.982 | n.d. | 1.80 |
| V3 | B3 |  | 15.0 | 15.3 | 14.1 | 2.777 | n.d. | 1.23 |
| 2 | C2 | 7.7 | 19.1 | 19.5 | 18.0 | 3.1 | 1.13 | 2.68 |
| V3 | C3 | 7.7 | 19.0 | 19.4 | 17.9 | 3.1 | 1.13 | 2.66 |

TABLE 3

Electrochemical data for the cathode materials from examples 1, 2 and V3

| Example | Material | Capacity (C/10) | Capacity (C/5) | Capacity (6.5 C) |
|---|---|---|---|---|
| 1 | C1 | 145.2 | 144.2 | 100.8 |
| 2 | C2 | 147.5 | 144.8 | 100.5 |
| V3 | C3 | 144.6 | 142.4 | 95.1 |

The invention claimed is:

1. A process for preparing a lithium mixed metal oxide, the process comprising
   a) thermally treating a mixture (A) in the presence of oxygen with continual mixing to form an intermediate (B), wherein:
   the mixture (A) comprises a transition metal compound comprised of manganese, cobalt, and nickel, and a lithium salt (L);
   the intermediate (B) comprises a lithium-comprising mixed metal hydroxide and a lithium-comprising mixed metal oxide hydroxide, where manganese, cobalt and nickel are comprised in the ratio (1-a-b):a:b, and the oxidation state averaged over all ions of manganese, cobalt and nickel is at least 4-1.75a-1.75b, such that 0≤a≤0.5 and 0.1≤b≤0.8; and
   the lithium salt (L) does not melt during the thermal treatment; and
   b) thermally treating the intermediate (B) without mixing and in the presence of oxygen,
   to form the lithium mixed metal oxide comprising lithium, manganese, cobalt and nickel having a stoichiometric ratio of lithium to all transition metals of greater than 1,
   wherein the temperature of said thermally treating in a) is from 310° C. to 400° C.

2. The process according to claim 1, wherein the thermal treatment of the intermediate (B) occurs in a tunnel kiln, a chamber furnace, or both.

3. The process according to claim 1 or claim 2, wherein the thermal treatment of the intermediate (B) occurs with an oxygen-comprising gas stream introduced essentially perpendicular to or counter to a predominant flow direction of the intermediate (B).

4. The process according to claim 1 or claim 2, wherein the thermal treatment of the mixture (A) occurs in a rotary tube furnace, a rotary bulb furnace, or both.

5. The process according to claim 1 or claim 2, wherein the thermal treatment of the mixture (A) occurs with an oxygen-comprising gas stream introduced essentially in a predominant direction of flow of the mixture (A).

6. The process according to claim 1 or claim 2, wherein the lithium salt (L) is lithium hydroxide.

7. The process according to claim 1 or claim 2, wherein the lithium salt (L) is lithium carbonate.

8. The process according to claim 1 or claim 2, wherein the mixture (A) is obtained by a method comprising spray drying of a suspension comprising water, at least one lithium salt (L) and at least one transition metal compound, with at least the lithium salt (L) being completely dissolved in the suspension.

9. The process according to claim 1 or claim 2, wherein the mixture (A) is obtained by a method comprising mixing at least one lithium salt (L) with at least one transition metal compound to obtain a starting mixture and subsequently adding water to the starting mixture.

10. The process according to claim 1 or claim 2, wherein the temperature of said thermally treating in a) is from 340° C. to 390° C.

* * * * *